US012512071B2

(12) United States Patent
Huang et al.

(10) Patent No.: US 12,512,071 B2
(45) Date of Patent: Dec. 30, 2025

(54) LUMINANCE COMPENSATION METHOD OF MOTION VECTOR IN LOCAL DIMMING

(71) Applicant: HIMAX TECHNOLOGIES LIMITED, Tainan (TW)

(72) Inventors: Chao-Chen Huang, Tainan (TW); Tsai-Hsing Chen, Tainan (TW); Cheng-Che Tsai, Tainan (TW); Ching-Wen Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/645,337

(22) Filed: Apr. 24, 2024

(65) Prior Publication Data

US 2025/0336370 A1 Oct. 30, 2025

(51) Int. Cl.

*G09G 3/34* (2006.01)
*G09G 3/20* (2006.01)

(52) U.S. Cl.

CPC ......... *G09G 3/3406* (2013.01); *G09G 3/2007* (2013.01); *G09G 2320/0233* (2013.01); *G09G 2320/064* (2013.01); *G09G 2320/0653* (2013.01)

(58) Field of Classification Search

CPC ............... G09G 3/3406; G09G 3/2007; G09G 2320/0233; G09G 2320/064; G09G 2320/0653

See application file for complete search history.

(56) References Cited

U.S. PATENT DOCUMENTS

| | | | | |
|---|---|---|---|---|
| 2003/0210211 | A1 | 11/2003 | Moon | |
| 2007/0153117 | A1 | 7/2007 | Lin | |
| 2009/0079688 | A1 * | 3/2009 | Chen | G09G 3/3406 345/102 |
| 2012/0194536 | A1 * | 8/2012 | Pyo | G09G 3/3611 345/589 |
| 2019/0130851 | A1 * | 5/2019 | Cui | G09G 3/3406 |
| 2019/0348001 | A1 * | 11/2019 | Shi | G09G 3/32 |
| 2020/0064688 | A1 * | 2/2020 | Lin | G02F 1/133603 |
| 2020/0135122 | A1 * | 4/2020 | Song | G09G 3/3413 |
| 2021/0005162 | A1 * | 1/2021 | Qin | G09G 3/3607 |
| 2022/0310001 | A1 * | 9/2022 | Youn | G09G 5/10 |
| 2023/0018404 | A1 | 1/2023 | Zen | |
| 2024/0013347 | A1 | 1/2024 | Yang | |

FOREIGN PATENT DOCUMENTS

| | | | |
|---|---|---|---|
| CN | 108962150 A | | 12/2018 |
| CN | 111091788 A | | 5/2020 |
| CN | 114373431 A | | 4/2022 |
| JP | 2022175370 A | * | 11/2022 |

OTHER PUBLICATIONS

Wu, the specification, including the claims, and drawings in the U.S. Appl. No. 18/496,947, filed Oct. 30, 2023.

* cited by examiner

*Primary Examiner* — Ke Xiao
*Assistant Examiner* — Jennifer L Zubajlo
(74) *Attorney, Agent, or Firm* — Winston Hsu

(57) ABSTRACT

A method of luminance compensation includes determining a speed of an object according to a PWM (pulse width modulation) table of a current frame and a PWM table of a previous frame; generating a new PWM table according to the speed and the PWM table of the current frame; and performing luminance compensation according to the PWM table of the current frame and the new PWM table.

14 Claims, 7 Drawing Sheets

LUMINANCE COMPENSATION METHOD OF MOTION VECTOR IN LOCAL DIMMING

BACKGROUND OF THE INVENTION

1. Field of the Invention

The present invention is related to local dimming, and in particular, to a method of luminance compensation.

2. Description of the Prior Art

Local dimming is a technology implemented in LED (Light Emitting Diode) TVs to improve the contrast ratio in dark scenes by dimming the backlight in specific zones of the screen. Local dimming makes the dark parts of the image appear darker while the bright parts of the image remain bright, thereby enhancing contrast and improving the overall image quality.

A local dimming backlight technology is a direct-lit architecture where the LEDs are directly behind the LCD (Liquid-Crystal Display) panel. Each LED or zone of LEDs may dim individually to illuminate the desired pixels of the display. When an object moves on the LCD panel, it is crucial for the object's brightness to remain consistent. Otherwise, variations in brightness may lead to flickering. However, due to the structure, if the background environment of the moving object is dark or even black, the brightness uniformity of the moving object may be insufficient, causing flickering.

SUMMARY OF THE INVENTION

An embodiment of the present invention provides a method of luminance compensation. The method includes determining a speed of an object according to a PWM (pulse width modulation) table of a current frame and a PWM table of a previous frame; generating a new PWM table according to the speed and the PWM table of the current frame; and performing luminance compensation according to the PWM table of the current frame and the new PWM table.

Another embodiment of the present invention provides a method of luminance compensation. The method includes determining a speed of an object according to a pulse width modulation (PWM) table of a current frame and a PWM table of a previous frame; generating a new PWM table according to the speed and the PWM table of the current frame if the object in a frame prior to the previous frame and the object in the previous frame are in different blocks; and performing luminance compensation according to the PWM table of the current frame and the new PWM table.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
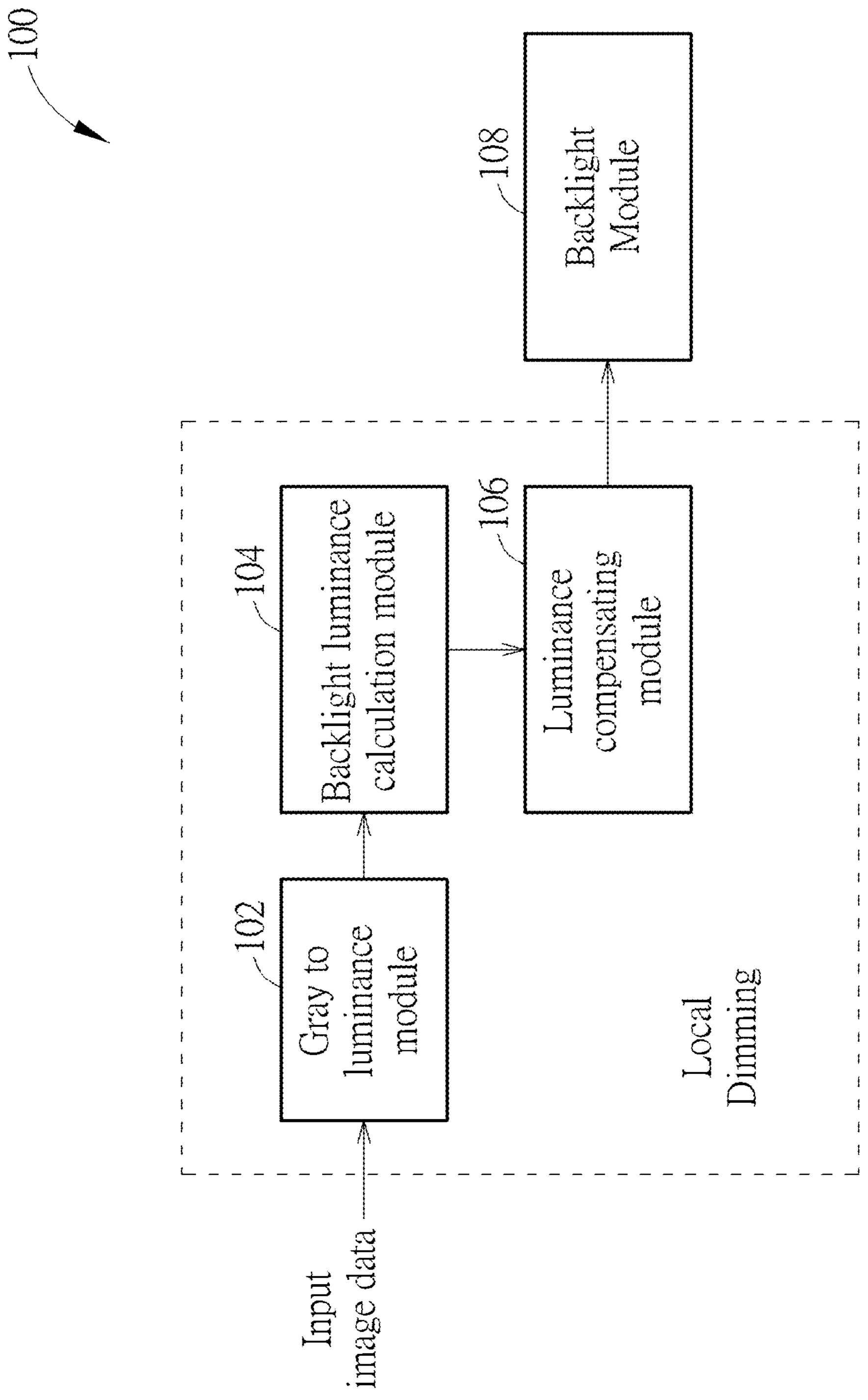
FIG. 1 is a schematic diagram of a luminance compensation system according to an embodiment of the present invention.

FIG. 1 is a schematic diagram of a luminance compensation system 100 according to an embodiment of the present invention. The luminance compensation system 100 may be implemented in a display. The luminance compensation system 100 includes a gray to luminance module 102, a backlight luminance calculation module 104, a luminance compensating module 106, and a backlight module 108. The gray to luminance module 102 may receive input image data in grayscale and convert the grayscale information into luminance. The image data includes multiple frames, and the backlight luminance calculation module 104 may generate a PWM (Pulse-width modulation) table corresponding to a frame according to the input image data. Then, the luminance compensating module 106 may perform luminance compensation according to the PWM tables.

Figure 2:
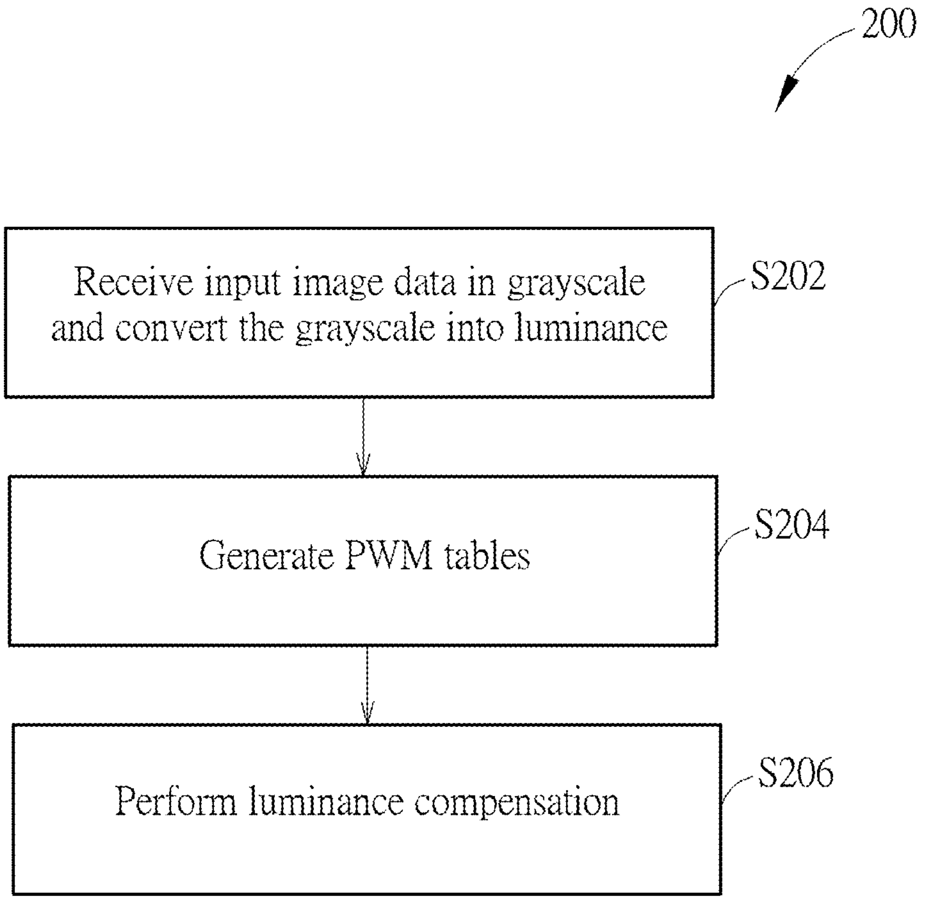
FIG. 2 is a flow chart of a luminance compensation method of the luminance compensation system in FIG. 1.

FIG. 2 is a flow chart of a luminance compensation method 200 of the luminance compensation system 100 in FIG. 1. The luminance compensation method 200 includes steps S202 to S206. Any reasonable technical changes or step adjustments fall within the scope of the disclosure of the present invention. Steps S202 to S206 are as follows:

- Step S202: Receive input image data in grayscale and convert the grayscales into luminance;
- Step S204: Generate PWM tables;
- Step S206: Perform luminance compensation.

In step S202, the gray to luminance module 102 may receive input image data in grayscale and convert the grayscales into luminance. For example, the gray scales of a pixel are (R, G, B), then the luminance may be Max(R, G, B), which is the maximum values among R, G, and B, but not limited thereto.

A frame (more specifically, a backlight module of the display) may be divided into a number of blocks. For example, the frame may be divided into M*N blocks, M and N being positive integers. In step S204, the backlight luminance calculation module 104 may generate an M*N PWM table corresponding to a current frame and an M*N PWM table corresponding to a previous frame in the input image data. Each coefficient in the PWM table corresponds to a block of the frame and may be generated by a local dimming algorithm according to the information of the corresponding block.

Figure 3:
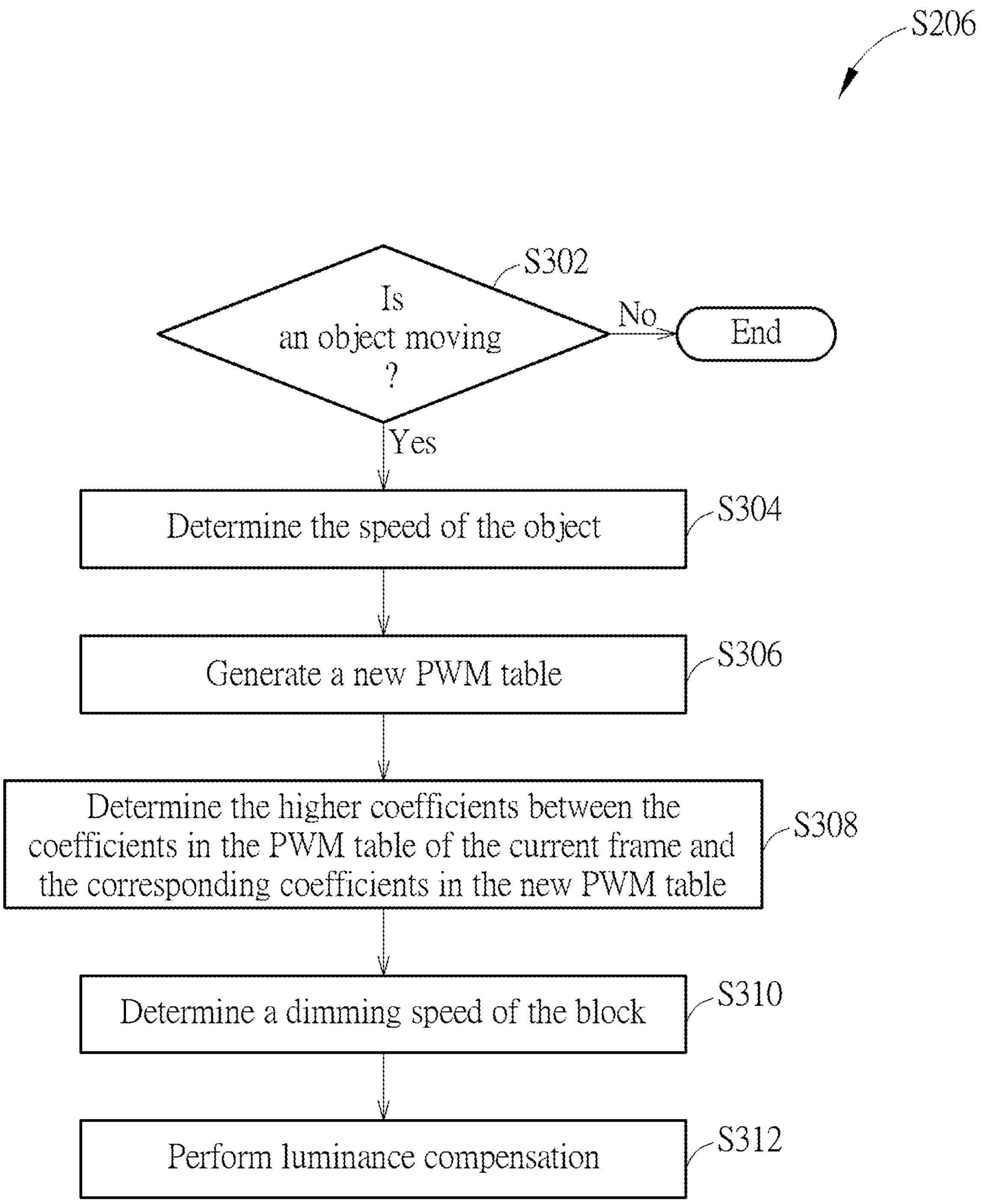
FIG. 3 is a flow chart of step S206 of the luminance compensation system 100 in FIG. 1.

In step S206, the luminance compensating module 106 may perform luminance compensation according to the PWM tables. FIG. 3 is a flow chart of step S206 of the luminance compensation system 100 in FIG. 1. Step S206 includes steps S302 to S312. Any reasonable technical changes or step adjustments fall within the scope of the disclosure of the present invention. Steps S302 to S312 are as follows:

- Step S302: Is an object moving? If so, go to step S304; else end;
- Step S304: Determine the speed of the object;
- Step S306: Generate a new PWM table;

Step S308: Determine the higher coefficients between the coefficients in the PWM table of the current frame and the corresponding coefficients in the new PWM table;

Step S310: Determine a dimming speed of the block;

Step S312: Perform luminance compensation.

In step S302, determine whether an object is moving according to the PWM table of the current frame and the PWM table of the previous frame. The object may be an icon. If a coefficient in the PWM table of the current frame is different from the corresponding coefficient in the PWM table of the previous frame, it means that there is an object moving on the panel. The object is determined as a moving object. If every coefficient in the PWM table of the current frame is the same as the corresponding coefficient in the PWM table of the previous frame, it means that the object is stationary. Step S304 to step S312 may be omitted when the object is stationary and the luminance compensation may not be performed to avoid halos.

Figure 4:
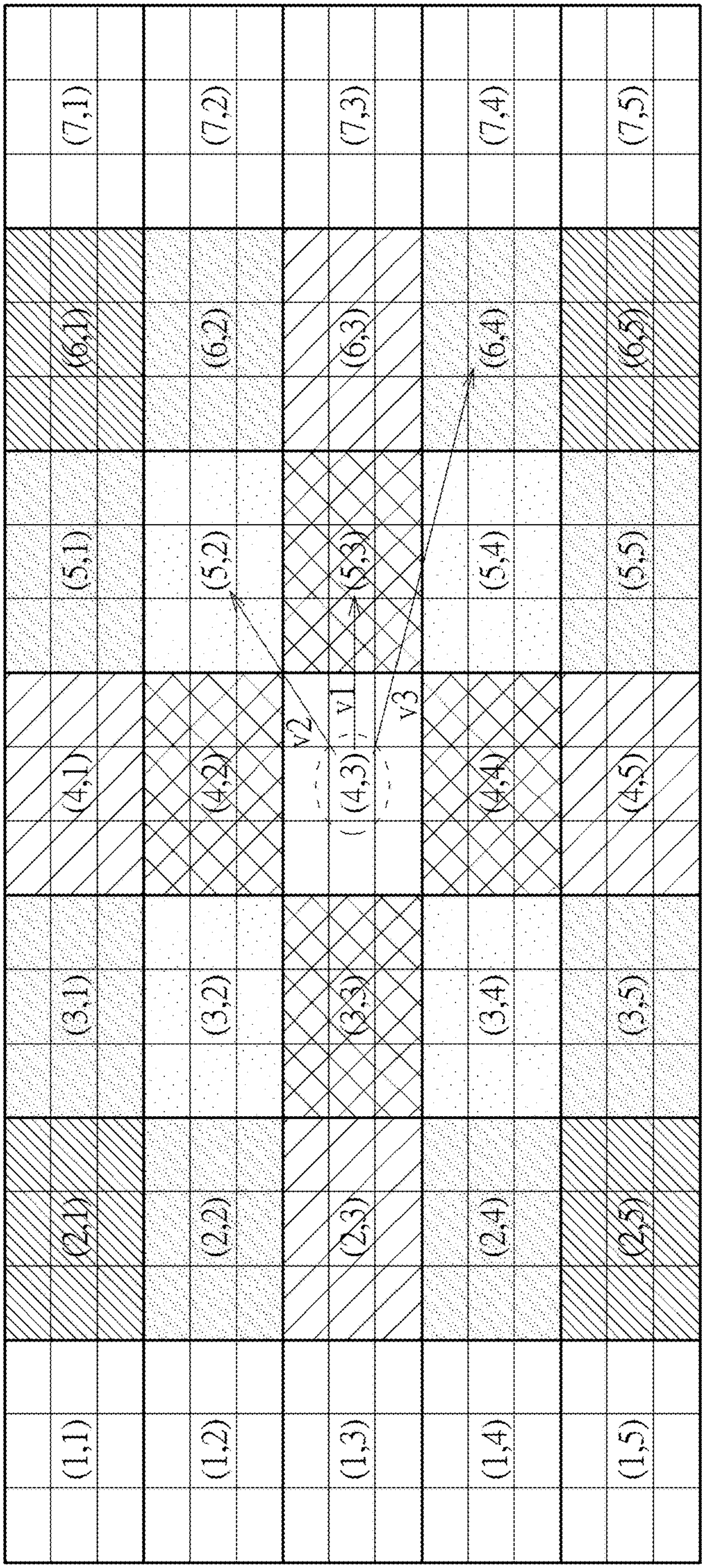
FIG. 4 is a schematic diagram of determining the speed of a moving object.

After determining the object is a moving object, in step S304, determine the speed of the object according to the PWM table of the current frame and the PWM table of the previous frame. A frame (more specifically, a backlight module of the display) may be divided into a number of zones. For example, the frame may be divided into J*K zones, J and K being positive integers. The position of the moving object is determined according to the zone with differences in PWM coefficients and the speed of the moving object is determined according to the position of the moving object. Please refer to FIG. 4 for an example. FIG. 4 is a schematic diagram of determining the speed of a moving object. As shown in FIG. 4, the frame is divided into 21*15 blocks and 7*5 zones; each zone contains 3*3 blocks. Each zone may be represented in the form of (C, R), where C is its column and R is its row. In FIG. 4, the object in the previous frame is in the zone (4, 3). When the object moves to, for example, the zone (5, 3) in the current frame, the coefficients in the zone (4, 3) and the zone (5, 3) of the PWM table of the current frame may be different from the corresponding coefficients in the PWM table of the previous frame. The speed of the moving object is determined according to the position of the object in the previous frame and the position of the object in the current frame. The zones are classified into several categories according to its distance from the object's position in the previous frame. The speed of the object may be determined according to the category of the zone where the object is located in the current frame.

For example, assume the position of the object in the previous frame is (C, R), and the position of the object in the current frame is (C', R'). If $|C'-C|=0$ and $|R'-R|\leq 1$, or $|C'-C|\leq 1$ and $|R'-R|=0$, indicating the object is located in the zone of a first category and having a first speed. As shown in FIG. 4, the object in the previous frame is in the zone (4, 3), the object moves to (5, 3) in the current frame as indicated by the arrow v1. Since $|4-5|\leq 1$ and $|3-3|=0$, the object is located in the zone of the first category and having the first speed. For the same reason, if the object moves to (4, 2), (3, 3) or (4, 4), the object is located in the zone of the first category and having the first speed. If $|C'-C|=1$ and $|R'-R|=1$, indicating the object is located in the zone of a second category and having a second speed. As shown in FIG. 4, the object in the previous frame is in the zone (4, 3), the object moves to (5, 2) in the current frame as indicated by the arrow v2. Since $|4-5|=1$ and $|3-2|=1$, the object is located in the zone of the second category and having the second speed. For the same reason, if the object moves to (3, 2), (3, 4) or (5, 4), the object is located in the zone of the second category and having the second speed. If $|C'-C|=1$ and $|R'-R|=2$, or $|C'-C|=2$ and $|R'-R|=1$, indicating the object is located in the zone of a third category and having a third speed. As shown in FIG. 4, the object in the previous frame is in the zone (4, 3), the object moves to (6, 4) in the current frame as indicated by the arrow v3. Since $|4-6|=2$ and $|3-4|=1$, the object is located in the zone of the third category and having the third speed. For the same reason, if the object moves to (3, 1), (5, 1), (2, 2), (6, 2), (2, 4), (3, 5) or (5, 5), the object is located in the zone of the third category and having the third speed. Since the farther the object moves means the faster the object moves, the first speed is smaller than the second speed, and the second speed is smaller than the third speed. In this example, the first speed may be considered as a low speed, the second speed may be considered as a middle speed, and the third speed may be considered as a high speed. By classifying zones into categories and determining the speed of the object according to the categories, the speed of the object can be defined. The present embodiment uses FIG. 4 as an example for the purpose of illustration. However, the definition and the number of categories of zones are not limited thereto. In other embodiments, zones may be classified into more categories and corresponding to different speeds.

Figure 5:
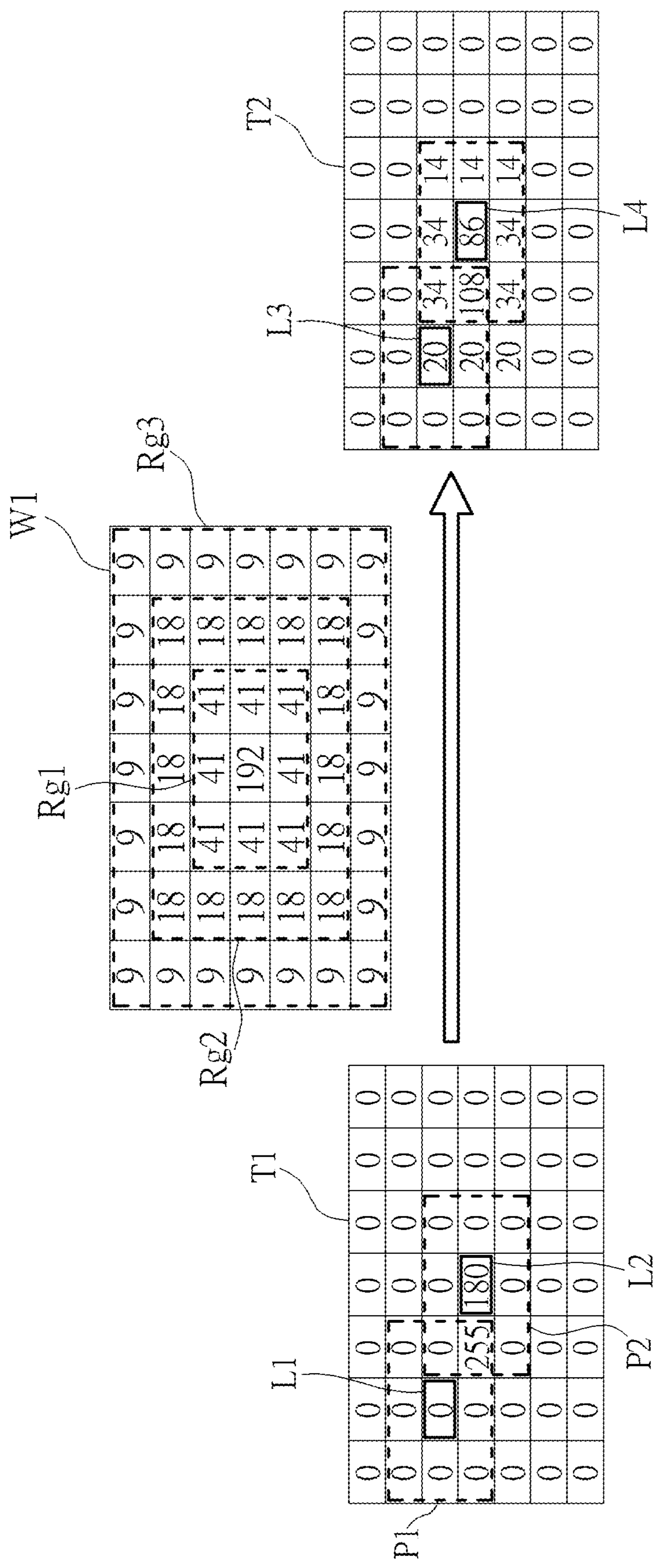
FIG. 5 is a schematic diagram of generating a new PWM table.

In step S306, a new PWM table is generated according to the speed, the PWM table of the current frame and a PWM weight table. A compensation range is determined in a weight matrix according to the speed of the object determined in step S304. Please refer to FIG. 5 for an example. FIG. 5 is a schematic diagram of generating a new PWM table. The PWM table T1 is a zone of the PWM table of the current frame, where a coefficient in the zone is different from the corresponding coefficient in the PWM table of the previous frame. W1 is a weight matrix corresponding to the zone. A compensation range is determined in a weight matrix W1 according to the speed of the object determined in step S304. A larger scope of the compensation range may correspond to a higher speed of the object. For example, if the speed of the object is determined as a low speed, the compensation range corresponding to the speed may be a small compensation range Rg1. If the speed of the object is determined as a middle speed, the compensation range corresponding to the speed may be a medium compensation range Rg2. If the speed of the object is determined as a high speed, the compensation range corresponding to the speed may be a large compensation range Rg3. The embodiment uses the small compensation range, the medium compensation range and the large compensation range as examples, but the present invention is not limited thereto. In other embodiments, there may be more different compensation ranges according to the speed. After determine the compensation range, the new PWM table is generated by dividing a sum of products of coefficients in the PWM table of the current frame and corresponding coefficients in the weight matrix within the compensation range by a sum of coefficients in the weight matrix within the compensation range for each coefficient in the PWM table of the current frame. Take FIG. 5 as an example, assuming the speed of the object is determined as a low speed, and the compensation range corresponding to the speed is the small compensation range Rg1; overlap the small compensation range Rg1 with the PWM table T1, as shown in FIG. 5. When the small compensation range Rg1 is at the position P1, the coefficient of the center is the coefficient L1. The PWM table T2 is a zone of the new PWM table corresponding to the PWM table T1, and the corresponding coefficient of the coefficient L1 in the PWM table T2 is the coefficient L3. The coefficients in the new PWM table are calculated by dividing a sum of products of coefficients in the PWM table of the current frame and corresponding coefficients in the weight matrix within the compensation range by a sum of coefficients in the weight matrix within the compensation range for each coefficient in the PWM table of the current frame. For example, the coefficient L3 is (41*0+41*0+41*0+41*0+192*0+41*0+41*0+41*0+41*255)/weight sum. The weight sum is the sum of coefficients in the weight matrix within the compensation range. For example, the weight sum of the small compensation range Rg1 is 41+41+41+41+192+41+41+41+41=520. Therefore, the coefficient L3 is (41*0+41*0+41*0+41*0+192*0+41*0+41*0+41*0+41*255)/520, rounded down to 20. The compensation range may slide to change the center to calculate the coefficients in the new PWM table. For example, when the small compensation range Rg1 slide to the position P2, the coefficient of the center is the coefficient L2. The corresponding coefficient of the coefficient L2 in the PWM table T2 is the coefficient L4. The coefficient L4 is (41*0+41*0+41*0+41*255+192*180+41*0+41*0+41*0+41*0)/520, rounded down to 86. Through similar calculation, the coefficients in PWM table T2 may be calculated. And if each coefficient in a zone of the PWM table of the current frame is the same as the corresponding coefficient in the PWM table of the previous frame, the corresponding zone of the new PWM table may be the same as the zone of the PWM table of the current frame. Through step S306, the new PWM table may be generated.

Figure 6:
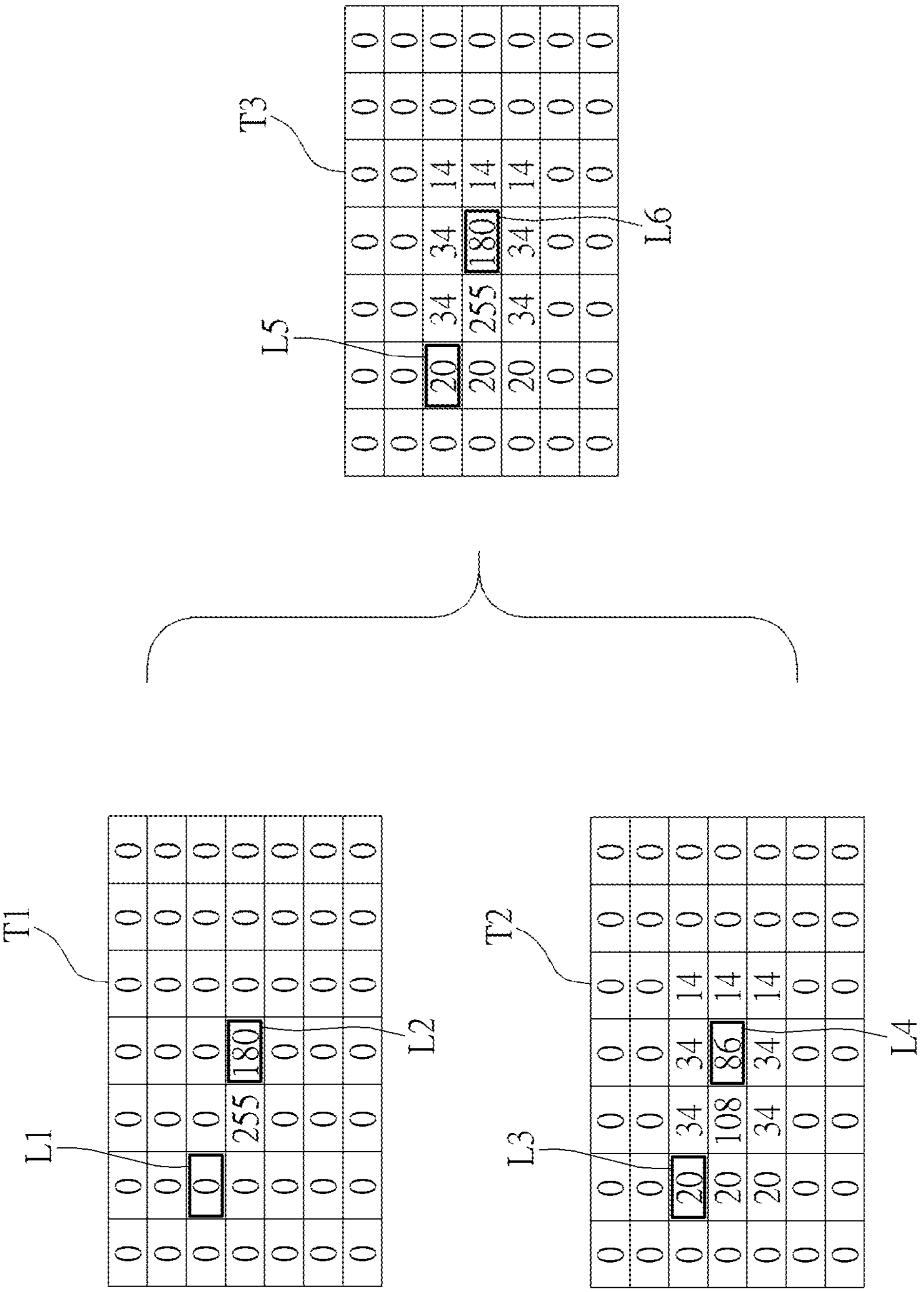
FIG. 6 is a schematic diagram of determining the higher coefficient.

In step S308, the coefficients in the PWM table of the current frame are compared with the corresponding coefficients in the new PWM table to determine the higher coefficients. The luminance compensation will be performed in step S312 according to the higher coefficients between the PWM table in the current frame and the corresponding coefficients in the new PWM table. Please refer to FIG. 6 for an example. FIG. 6 is a schematic diagram of determining the higher coefficients. As shown in FIG. 6, the PWM table T1 is a zone of the PWM table of the current frame and the PWM table T2 is a zone of the new PWM table corresponding to the PWM table T1. The PWM table T3 is a zone of a final PWM table corresponding to the PWM table T1 and the PWM table T2, and the luminance compensation will be performed in step S312 according to the final PWM table. As shown in FIG. 6, each coefficient in the PWM table T3 is the higher coefficient between the corresponding coefficient in the PWM table of the current frame and the corresponding coefficient in the new PWM table. For example, the coefficient L1 in the PWM table T1 is 0 and the corresponding coefficient L3 in the PWM table T2 is 20. Since 20>0, the corresponding coefficient L5 in the final PWM table T3 is 20. Similarly, the coefficient L2 in the PWM table T1 is 180 and the corresponding coefficient L4 in the PWM table T2 is 86. Since 180>86, the corresponding coefficient L6 in the PWM table T3 is 180. Through similar calculation, the coefficients in the final PWM table may be calculated. By performing the luminance compensation according to the higher coefficients between the coefficients in the PWM table of the current frame and the corresponding coefficients in the new PWM table, it can be ensured that the brightness after performing luminance compensation may not be lower than the brightness without luminance compensation.

In step S310, a dimming speed of the block is determined according to the PWM table of the current frame and the PWM table of the previous frame. When the coefficient of a block in the PWM table of the current frame is greater than the coefficient of the corresponding block in the PWM table of the previous frame, the dimming speed of the block is increased. And when the coefficient of a block in the PWM table of the current frame is smaller than the coefficient of the corresponding block in the PWM table of the previous frame, the dimming speed of the block is decreased. In other words, when a block becomes brighter, the dimming speed is accelerated to avoid uneven brightness. And when a block becomes darker, the dimming speed is slowed down to avoid smearing. Then in step S312, luminance compensation is performed according to the final PWM table calculated in step S308 and the dimming speed determined in step S310. The luminance compensation method 200 performs luminance compensation by determining the speed of the object and the brightness changes of the frame, reducing flickering when the object moves and achieving consistent brightness uniformity when performing local dimming.

Figure 7:
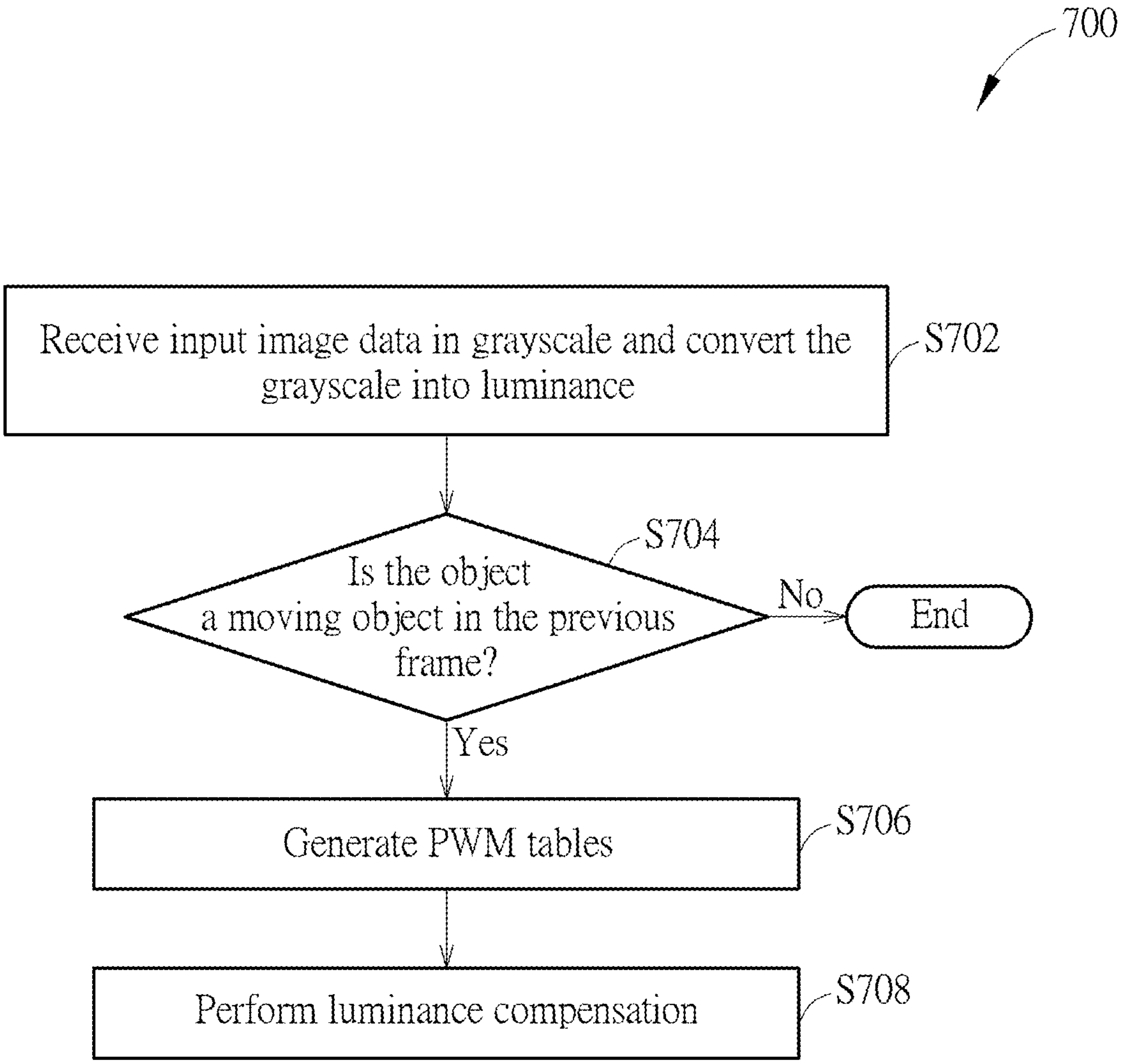
FIG. 7 is a flow chart of another luminance compensation method of the luminance compensation system in FIG. 1.

FIG. 7 is a flow chart of another luminance compensation method 700 of the luminance compensation system in FIG. 1. The luminance compensation method 700 includes steps S702 to S706. Any reasonable technical changes or step adjustments fall within the scope of the disclosure of the present invention. Steps S702 to S708 are as follows:

Step S702: Receive input image data in grayscale and convert the grayscale into luminance;

Step S704: Is the object a moving object in the previous frame? If so, go to step S706; else end;

Step S706: Generate PWM tables;

Step S708: Perform luminance compensation.

Step S702, step S706 and step S708 are similar to step S202, step S204 and step S206 respectively and will not be described again here. In step S704, determine if the object is a moving object in the previous frame by determining if the object in the frame prior to the previous frame and the object in the previous frame are in different blocks. If a coefficient in the PWM table of the previous frame is different from the corresponding coefficient in the PWM table of the frame prior to the previous frame, it means that the object is in different blocks. If the object is a moving object in the previous frame, proceed to step S706. If the object is not a moving object in the previous frame, step S706 and S708 may be omitted to avoid flickering. The luminance compensation method 700 is an example for the purpose of illustration. However, the present invention is not limited thereto. In some embodiments, if the object is determined as a moving object in the previous frame, step S704 may be omitted to avoid flickering.

The present invention discloses the luminance compensation method 200 and 700. Through the luminance compensation methods, luminance compensation may be performed by determining the speed of the object and the brightness changes of the frame, reducing flickering when the object moves and achieving consistent brightness uniformity when performing local dimming.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A luminance compensation method comprising:

determining a speed of an object according to a pulse width modulation (PWM) table of a current frame and a PWM table of a previous frame;

determining a compensation range in a weight matrix according to the speed;

generating a new PWM table by dividing a sum of products of coefficients in the PWM table of the current frame and corresponding coefficients in the weight matrix within the compensation range by a sum of coefficients in the weight matrix within the compensation range for each coefficient in the PWM table of the current frame; and performing luminance compensation according to the PWM table of the current frame and the new PWM table.

2. The method of claim 1, further comprising generating the PWM table of the current frame and the PWM table of the previous frame according to input image data.

3. The method of claim 1, wherein a larger scope of the compensation range corresponds to a higher speed of the object.

4. The method of claim 1, wherein performing luminance compensation according to the PWM table of the current frame and the new PWM table comprises:

performing luminance compensation according to higher coefficients between coefficients in the PWM table of the current frame and corresponding coefficients in the new PWM table.

5. The method of claim 1, further comprising when a coefficient of a block of the PWM table of the current frame is greater than a coefficient of the block of the PWM table of the previous frame, increasing a dimming speed of the block.

6. The method of claim 1, further comprising when a coefficient of the block of the PWM table of the current frame is smaller than a coefficient of the block of the PWM table of the previous frame, decreasing a dimming speed of the block.

7. A luminance compensation method comprising:

determining a speed of an object according to a pulse width modulation (PWM) table of a current frame and a PWM table of a previous frame;

determining if the object in a frame prior to the previous frame and the object in the previous frame are in different blocks;

generating the new PWM table according to the speed and the PWM table of the current frame if the object in the frame prior to the previous frame and the object in the previous frame are in different blocks; and performing luminance compensation according to the PWM table of the current frame and the new PWM table.

8. A luminance compensation system comprising:

a gray to luminance module;

a backlight luminance calculation module coupled to the gray to luminance module, and configured to:

determining a speed of an object according to a pulse width modulation (PWM) table of a current frame and a PWM table of a previous frame;

determine a compensation range in a weight matrix according to the speed; and generate a new PWM table by dividing a sum of products of coefficients in the PWM table of the current frame and corresponding coefficients in the weight matrix within the compensation range by a sum of coefficients in the weight matrix within the compensation range for each coefficient in the PWM table of the current frame;

a luminance compensating module coupled to the backlight luminance calculation module, and configured to perform luminance compensation according to the PWM table of the current frame and the new PWM table; and a backlight module coupled to the luminance compensating module.

9. The luminance compensation system of claim 8, wherein the backlight luminance calculation module is further configured to generate the PWM table of the current frame and the PWM table of the previous frame according to input image data.

10. The luminance compensation system of claim 8, wherein a larger scope of the compensation range corresponds to a higher speed of the object.

11. The luminance compensation system of claim 8, wherein the luminance compensating module configured to luminance compensation according to the PWM table of the current frame and the new PWM table comprises the luminance compensating module configured to:

perform luminance compensation according to higher coefficients between coefficients in the PWM table of the current frame and corresponding coefficients in the new PWM table.

12. The luminance compensation system of claim 8, further comprising when a coefficient of a block of the PWM table of the current frame is greater than a coefficient of the block of the PWM table of the previous frame, increasing a dimming speed of the block.

13. The luminance compensation system of claim 8, further comprising when a coefficient of the block of the PWM table of the current frame is smaller than a coefficient of the block of the PWM table of the previous frame, decreasing a dimming speed of the block.

14. A luminance compensation system comprising:

a gray to luminance module;

a backlight luminance calculation module coupled to the gray to luminance module, and configured to:

determining a speed of an object according to a pulse width modulation PWM) table of a current frame and a PWM table of a previous frame;

determine if the object in a frame prior to the previous frame and the object in the previous frame are in different blocks; and generate a new PWM table according to the speed and the PWM table of the current frame if the object in the frame prior to the previous frame and the object in the previous frame are in different blocks;

a luminance compensating module coupled to the backlight luminance calculation module, and configured to perform luminance compensation according to the PWM table of the current frame and the new PWM table; and a backlight module coupled to the luminance compensating module.

* * * * *